Aug. 25, 1931.                C. W. PRICE                1,820,632
                             LIGHT REFLECTOR
                           Filed Sept. 27, 1929
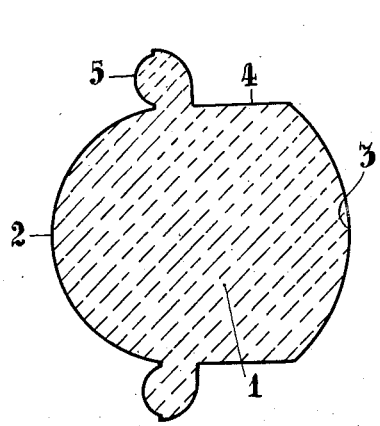 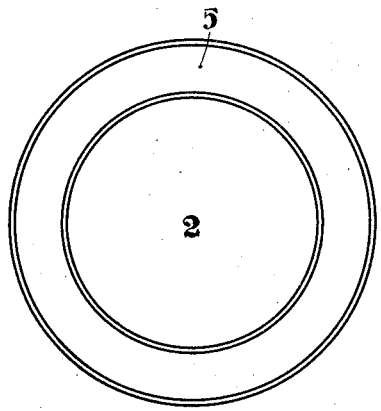
Fig. 1.                              Fig. 2.

Patented Aug. 25, 1931

1,820,632

UNITED STATES PATENT OFFICE

CHARLES WILLIAM PRICE, OF BIRMINGHAM, ENGLAND

LIGHT REFLECTOR

Application filed September 27, 1929, Serial No. 395,655, and in Great Britain October 12, 1928.

This invention comprises certain improvements in light reflectors, and it has for its object a reflector which will be useful under all light conditions.

Reflectors at present in use, are in the main, only effective either as a reflector for night conditions, or as a reflector for day conditions, with the result that a sign or indication formed of reflectors may be effective at one time and ineffective at another time.

According to the present improvements the reflector is so constructed that it will be effective, under all light conditions, for reflecting back the light incident thereon. The reflector comprises a central portion adapted to receive and reflect back light rays incident thereon with an intense brilliance and substantially in the direction of the source of light such as from the head lamp of a motor vehicle at night, and a portion at the side of, or surrounding the centre portion, adapted to receive and reflect back light incident thereon over a wide angular range between the incident and reflected light ray so that it is effective in all observation positions, for instance, during the day when light is incident thereon from many directions. The centre portion is conveniently of the known type comprising a solid piece of glass having a convex front and rear surface, such surfaces having preferably a common centre of curvature. A portion (or portions) of glass lie at the side of, or surrounding the centre portion which is, or are, of comparatively small thickness, so that daylight or light incident thereon can be reflected over a wide angular range to give an effect of brilliance in any observation position. The solid piece of glass has conveniently a cylindrical wall which, together with the rear curved face, may be arranged to form a reflecting surface.

Referring to the drawings:—

Figure 1 is a central longitudinal sectional elevation of a reflector constructed according to this invention, and Figure 2 is a face view.

According to a convenient embodiment of this invention, the reflector comprises a solid block of glass 1, having a convex refracting surface 2 and a concave reflecting surface 3. The centre of curvature of the surfaces 2 and 3 lie at a common point. The solid block of glass has conveniently a cylindrical wall 4. A bead 5 is provided conveniently at the junction of the cylindrical wall 4 and the convex surface 2. Light rays incident on the refracting surface 2 will be reflected from the surfaces 4 and 3 so that light will be returned to give a brilliant effect such as from a motor head lamp at night time. Except in particular positions, the light returned from the centre portion of the reflector will be ineffective during the day. Daylight however incident on the bead 5 will be reflected to give a brilliant effect in substantially all positions. The reflector will therefore be effective under all light conditions, and therefore a sign built up of these reflectors will be of a brilliant nature during the day, and will also be of a brilliant nature when light is incident thereon from a particular source at night time.

The solid block of glass 1 may be tinted red or any other suitable colour, or in lieu thereof the reflecting surfaces 4 and 3 may be coloured whilst the glass itself is white. The reflecting surfaces 4 and 3 may have various colours thereon instead of a single colour, so that a varied coloured lighting effect is obtained. The surfaces 4 and 3 of the glass and the back of the bead 5 may be silvered or unsilvered or may or may not be fitted in a polished container. Again the surface 3 and not the surface 4 may be silvered or fitted with a polished metal backing. The construction of the reflector is capable of considerable modification. For instance the bead 5 may be square, rectangular, circular or any other suitable cross-sectional shape. The surface of the bead 5 which may be of any suitable cross section may be studded, lipped or facetted. In lieu of the bead 5 entirely surrounding the centre portion, projections at intervals only may be provided. In lieu of the wall 4 being cylindrical, it may be of any other shape. In a modified form the solid piece of glass may have a flat back whilst the front face is convex shaped in the centre which is bordered by a thin bead or projections which merge into the edge of the flat back.

The centre portion of the light reflector constructed according to this invention is comparatively thick whilst the surrounding bead or the like is comparatively thin. During the day therefore, in the case of, for instance glass tinted green, the centre portion will be dark or deep green whilst the bead will be light green illuminated by reflected light. At night artificial light, as from a motor head lamp, incident on the reflector will be reflected back by the centre portion and consequently illuminated whilst the bead portion will appear dark. Light reflected from the bead 5 will also in some cases be refracted through the convex front of the lens.

Claims.

1. A light reflector comprising a solid piece of glass having a convex front face and a concave rear reflecting face for reflecting back the light rays in the direction of the source of light, and a bead of glass having a reflecting back surface surrounding the solid centre portion so that light rays incident on the bead will be reflected by the back surface of the bead in a scattered direction or over a wide angular range.

2. A reflector comprising a solid cylindrical piece of glass having a convex front face and a concave reflecting rear face, and having a bead or rim of glass of comparatively small thickness surrounding the front convex face, so that light will be reflected from the back surface of the bead, and a polished reflecting material applied to the back surface of the bead, and the cylindrical wall and rear reflecting face for reflecting the light passing through the front of the lens and incident on any part of the wall of the lens.

In witness whereof I have signed this specification at Birmingham, England.

CHARLES WILLIAM PRICE.